(12) United States Patent
Welch et al.

(10) Patent No.: US 12,208,801 B2
(45) Date of Patent: Jan. 28, 2025

(54) DRIVE MODE SELECTION FOR ELECTRIC VEHICLE RACING

(71) Applicant: GM GLOBAL TECHNOLOGY OPERATIONS LLC, Detroit, MI (US)

(72) Inventors: Sean M. Welch, Bruce Township, MI (US); Michael A. Ryba, West Bloomfield, MI (US); Sami Ahmed, Orion Township, MI (US); Michael G. Petrucci, Howell, MI (US); Brandon S. Vivian, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 17/954,821

(22) Filed: Sep. 28, 2022

(65) Prior Publication Data

US 2024/0101120 A1  Mar. 28, 2024

(51) Int. Cl.
*B60W 30/182* (2020.01)
*B60W 20/13* (2016.01)
*B60W 50/08* (2020.01)
*B62D 1/04* (2006.01)

(52) U.S. Cl.
CPC .......... *B60W 30/182* (2013.01); *B60W 20/13* (2016.01); *B60W 50/082* (2013.01); *B62D 1/046* (2013.01); *B60W 2300/28* (2013.01); *B60W 2510/244* (2013.01); *B60W 2540/10* (2013.01)

(58) Field of Classification Search
None
See application file for complete search history.

(56) References Cited

U.S. PATENT DOCUMENTS

| | | | |
|---|---|---|---|
| 2013/0218386 A1* | 8/2013 | Fisker | B60K 6/46 903/930 |
| 2014/0054100 A1* | 2/2014 | Boskovitch | B60K 6/52 180/242 |
| 2016/0362019 A1* | 12/2016 | Gregg | F02D 41/10 |
| 2022/0063593 A1* | 3/2022 | Fukuda | B60W 20/40 |

FOREIGN PATENT DOCUMENTS

DE  102007023569 A1 * 11/2007 .......... B60W 30/182

\* cited by examiner

*Primary Examiner* — Justin S Lee
(74) *Attorney, Agent, or Firm* — Quinn IP Law

(57) ABSTRACT

A system for limiting performance inconsistences of an electric vehicle during a race or other circumstance when consistent, high performance output is desired, such as by enabling a driver to selectively engage endurance and qualify drive modes to control a supply of electrical power used for driving the electric vehicle.

20 Claims, 2 Drawing Sheets

DRIVE MODE SELECTION FOR ELECTRIC VEHICLE RACING

INTRODUCTION

The present disclosure relates to controlling an electric vehicle according to selectable drive modes, such as but not necessarily limited to controlling the electric vehicle according to an endurance mode and a qualify mode when racing.

An electric vehicle may be considered as a class of vehicle reliant on an electrical power source to provide a supply of electrical power to a traction motor, with the traction motor thereafter converting the electrical power to mechanical power for use by a propulsion system in driving the electric vehicle. When racing an electric vehicle, such as when racing the electric vehicle around a racetrack to achieve the fastest time or to complete a certain number of laps before other competitors, a driver may desire the electric vehicle to operate beyond normal or typical operating ranges or otherwise place enhanced demands on the electrical power source. The enhanced demands may cause the supply from the electrical power source to decrease faster than the supply would under less extreme circumstances, which can cause performance of the propulsion system to correspondingly decline, resulting in slower speeds, and in some situations, preventing the electric vehicle from finishing a race.

While generators, regenerative braking, solar, fuel cells, and other means may be included on the electric vehicle to resupply the electrical power source, the electrical power source may nonetheless be unable to keep up with the enhanced demands, and performance of the electric vehicle may become inconsistent, with unpredictably variability occurring with rapid supply shortages and unreliable, and often partial, resupply.

SUMMARY

One non-limiting aspect of the present disclosure relates to a system for limiting performance inconsistences during a race or other circumstance when consistent, high performance output is desired. The system may be configured to enable a drive to engage a track mode whereby a supply of electric power available for powering a traction motor or other driver of the vehicle may be controlled according to a plurality of sub-modes, such as an endurance mode and a qualify mode. The endurance mode may be used to detune, restrain, or otherwise limit an amount of the supply made available for driving the electric vehicle, which in turn may limit an upper range of performance in exchange for more electrical power consistency. The qualify mode may be used to make a maximum available amount of the supply available for driving the electric vehicle, which in turns allows the upper range of performance to be reached in exchange for more electrical power inconsistency. A mode controller may be used to enable the driver to selectively switch between the endurance and qualify modes, such as by using the endurance mode throughout most of a race when consistent performance is desired and using the qualify mode when demanding greater power to pass a competitor or to otherwise temporarily boost performance.

One non-limiting aspect of the present disclosure relates to a system for controlling a supply of electrical power available for powering a traction motor of an electric vehicle. The system may include an accelerator pedal operable between a plurality of pedal positions depending on a pedal input received from a driver, with the pedal positions representing a demand from the driver for powering the traction motor and with the pedal positions including at least a partial displacement position and a full displacement position. The system may further include a mode selector operable between an endurance state and a qualify state depending on a mode input received from a driver of the electric vehicle. The system may yet further include a mode controller operable to determine the mode selector to be in the endurance state or the qualify state and the accelerator pedal to be in the partial displacement position or the full displacement position. The mode controller is operable for controlling the supply to meet the demand according to an endurance mode when the endurance state and the full displacement position are determined, with the endurance mode providing a limited amount of the supply to the traction motor, and according to a qualify mode when the qualify state and the full displacement position are determined, with the qualify mode providing a maximum available amount of the supply to the traction motor.

The mode controller may be operable for controlling the supply to meet the demand according to the endurance mode when the endurance state and the partial displacement position are determined, and the endurance mode when the qualify state and the partial displacement position are determined.

The full displacement position may correspond with a displacement position of the accelerator pedal being at a maximum, and the partial displacement position may correspond with the displacement position being less than the maximum and greater than zero.

The limited amount may be a percentage of the maximum available amount less than 100 percent.

The mode controller may be configured to determine the percentage as a function of a performance input received as part of a performance calibration process.

The mode controller may be operable according to a temporary schedule, with the temporary schedule determining the qualify state while the driver is pushing or pulling the mode selector and the endurance state when the driver is not pushing or pulling the mode selector.

The mode controller may be operable according to a persistent schedule, with the persistent schedule determining the qualify state in response to determining a first occurrence of the driver pushing or pulling the mode selector and thereafter until determining a second occurrence of the of the driver pushing or pulling the mode selector, whereafter the endurance state is determined until a third occurrence of the pushing or pulling the mode selector.

The mode controller may switch between the qualify and endurance modes without stopping the electric vehicle.

The mode selector may be a paddle included on a steering wheel.

The mode selector may be a button included on a touch screen of an infotainment system or a tactile button included within a reach of the driver.

One non-limiting aspect of the present disclosure relates to a computer readable storage medium having a plurality of non-transitory instructions stored thereon, the non-transitory instructions being executable with a processor to facilitate controlling a supply of electrical power available for powering a traction motor of an electric vehicle. The non-transitory instructions may be operable for: determining a displacement position of an accelerator pedal to be one of a partial displacement position and a full displacement position, the displacement position representing a demand from a driver for powering the traction motor; determining a mode selector to be in one of an endurance state and a qualify state; controlling the supply to meet the demand according to an endurance mode when the endurance state and the full displacement position are determined; and controlling the supply to meet the demand according to a qualify mode when the qualify state and the full displacement position are determined.

The endurance mode may deliver a limited amount of the supply to meet the demand.

The qualify mode may deliver a maximum available amount of the supply to meet the demand.

The non-transitory instructions may be operable for controlling the supply to meet the demand according to the endurance mode when the partial displacement position is determined.

The non-transitory instructions may be operable for determining the qualify state when the driver is pushing or pulling a mode selector and determining the endurance state when the driver is not pushing or pulling the mode selector.

The non-transitory instructions may be operable for determining the qualify state from a first occurrence of the driver pushing or pulling a mode selector and thereafter until a second occurrence of the driver pushing or pulling the mode selector.

One non-limiting aspect of the present disclosure relates to a system for controlling a supply of electrical power available for powering a traction motor of an electric vehicle. The system may include a displacement position sensor operable to sense a displacement position of an accelerator pedal, with the displacement position representing a demand from a driver for powering the traction motor. The system may further include a mode selector operable between a qualify state and an endurance state. The system may yet further include a mode controller configured to control the supply to meet the demand according to an endurance mode when the displacement position is less than a maximum displacement position, the endurance mode when the displacement position is at the maximum displacement position and the mode selector is in the endurance state, and a qualify mode when the displacement position is at the maximum displacement position and the mode selector is in the qualify state.

The qualify mode may deliver a maximum available amount of the supply to meet the demand.

The endurance may deliver a limited amount of the supply to meet the demand when the displacement position is at the maximum, with the limited amount being less than the maximum available amount.

The mode controller may be configured to determine the mode selector to be in the qualify state when a pressure is applied thereto by the driver and to be in the endurance state in the absence of the pressure.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
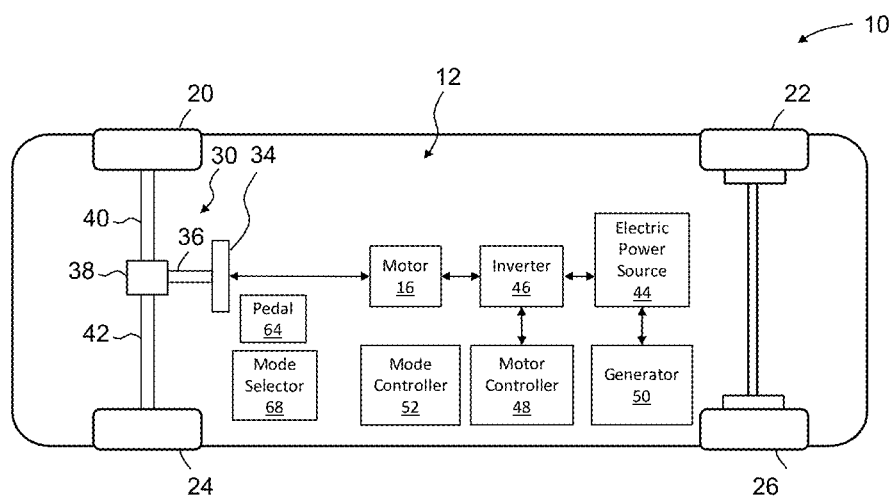
FIG. 1 illustrates a schematic view of an electric vehicle having a control system in accordance with one non-limiting aspect of the present disclosure.

FIG. 1 illustrates a schematic view of an electric vehicle 10 having a control system 12 in accordance with one non-limiting aspect of the present disclosure. The electric vehicle 10 is illustrated for exemplary purposes as including an electric motor 16 to provide rotational force/torque (mechanical power) to one or more of a plurality of wheels 20, 22, 24, 26, such as via a propulsion system 30 configured to connect the motor 16 to the front wheels 20, 24. The propulsion system 30 may include a transmission 34, a driveshaft 36, a differential 38, axles 40, 42, and/or other componentry to facilitate conveying rotative force from the motor 16 to the wheels 20, 22, 24, 26. A battery pack, fuel cell, or electrical power source 44 may be configured to provide a supply of direct current (DC) power to an inverter 46 whereupon the inverter 46 may be configured to supply alternating current (AC) power (electrical power) to the electric motor 16 for conversion to the mechanical power used to drive the propulsion system 30. A motor or mode controller 48 may be configured to generate control signals associated with directing and otherwise implementing the control of the motor 16 contemplated herein.

The electric vehicle 10 is predominately described as a two-wheel drive automobile for exemplary non-limited purposes as the present disclosure fully contemplates its use and application with four-wheel drive automobiles and other, non-automobile types of vehicles, including other types of electric vehicles, such as hybrid electric vehicles that rely additionally on an internal combustion engine (ICE) for propulsion. In a racing environment, which may be constrained to achieving the fastest lap time and/or completing a certain amount of laps before other competitors, the electric vehicle 10 may be requested to operate at upper ranges or extreme ends of its capabilities, often for a predefined or limited period of time. In these circumstances, the electric vehicle 10 may be limited in its ability to resupply or recharge the electrical power source due to a generator (regenerative braking or ICE deriver generator, solar, etc.) 50 being unable to keep up with demand and/or track rules, class requirements, and the like placing limits on using and/or recharging the electric power source 44. The racing environment, as such, creates a set of circumstances where it may be desirable to control the electric vehicle 10 differently than in non-racing environments, i.e., it may be beneficial to use drive modes differing from typical, roadway drive modes.

One non-limiting aspect of the present disclosure relates to a track mode for controlling the electric vehicle 10 in a manner intended to limit performance inconsistencies associated with the limitations placed on or inherent to recharging or resupply the electrical power source 44 during a race. The track mode may correspond with a drive mode selectable by a driver for purposes controlling the electric vehicle during a race. The track mode may enable a driver to selectively switch between an endurance mode and a qualify mode while racing without having to stop or interrupt driving of the electric vehicle 10. The track mode may be one of a plurality of drive modes available for controlling the electric vehicle 10. The motor controller 48 or other controller(s) (not shown) may be configured to facilitate controlling any number of vehicle operating parameters depending on the selected drive mode. The motor controller 48 may include a processor configured for executing a plurality of non-transitory instructions stored on a computer readable storage medium to facilitate implementing the various drive modes.

A drive mode table shown below illustrates a plurality of drive modes available for the electric vehicle 10 in accordance with one non-limiting aspect of the present disclosure.

| Vehicle | Drive Mode | | | Track | |
|---|---|---|---|---|---|
| Parameters | Snow/Ice | Tour | Sport | Qualify | Endurance |
| Max Propulsion Output | <100% | 100% | 100% | 100% | <100% |
| Pedal Map/ Transient | Level 2 | Level 1 | Level 3 | Level 2 | Level 2 |
| Cooling System Output | Normal | Normal | Elevated | Max | Max |
| Preconditioning Mode | No | No | No | Yes | Yes |
| Suspension | Tour | Tour | Sport | Track | Track |
| Steering | Sport | Tour | Sport | Track | Track |
| Braking | Tour | Tour | Sport | Track | Track |
| Chassis Controls | Snow/Ice | Tour | Sport | Track | Track |

In addition to the track mode, the available drive modes may include a snow/ice mode, a tour mode, and/or a sport mode, with values for each of a plurality of vehicle operating parameters being set according to the intended influence of the associated drive mode.

A maximum propulsion output parameter may be used to define a power value for specifying a percentage or an amount of the electrical power supply the driver may access or otherwise demand. A pedal map parameter may be used to define a pedal map value for representing a type of pedal map to be used in translating displacement of an accelerator pedal to a demand for electrical power delivery to the traction motor 16. A cooling system output parameter may be used to define a cooling value for representing a type of cooling strategy to be implemented, e.g., a cooling system of the vehicle may be used to cool the electrical power source 50 and/or other components of the vehicle, such as according to a normal, elevated, and/or max setting. The max setting may provide enhanced cooling of the traction motor 16, for example, at the expense of consuming more electrical power (e.g., to driver compressors or fan speed at elevated levels) in exchange for maximizing performance of the traction motor 16. A preconditioning parameter may be used to define a preconditioning value to be used in specifying when schedules, routines, etc., may be implemented, which is shown for exemplary purposes as being a binary value indicating the preconditioning to be either turned on or turned off. A suspension parameter may be used to define a suspension value for representing a type of suspension to be implemented. A steering parameter may be used to define a steering value for representing a type of steering control to be implemented. A braking parameter may be used to define a braking value for representing a type of braking control to be implemented. A chassis control parameter may be used to define a chassis value for representing a type of chassis control to be implemented.

The present disclosure fully contemplates including more or less of the tabled vehicle operating parameters, and merely presents the foregoing as exemplary illustrations of various controllable parameters. While the values need not be so similar, it may beneficial when racing to maximize or tailor each available operating parameter for racing such that some of the values set for the various vehicle operating parameters associated with the track mode are shown to be identical for both of the qualifying and endurance modes, with the exception of the power values being different for the maximum propulsion output parameter. The consumption of electrical power while racing may be a significant influence on an ability of electric vehicle 10 to perform consistently throughout a race. As such, one non-limiting aspect of the present disclosure contemplates the endurance mode may be used to detune, restrain, or otherwise limit an amount of the supply made available for driving the electric vehicle, which in turn may limit an upper range of performance in exchange for more electrical power consistency, whereby the qualify mode may be used to make an unlimited amount or a maximum available amount of the supply available for driving the electric vehicle, which in turn allows the upper range of performance to be reached in exchange for more electrical power inconsistency. In this manner, the endurance mode may be used throughout most of a race when consistent performance is desired, with the driver periodically switching to the qualify mode when demanding greater access to the supply to pass a competitor or to temporarily boost performance.

The system 12 may include a mode controller 52 to facilitate implementing the drive modes. The controller 52 may, at least for that purpose, operate in cooperation with various sensors, controllers, modules, and other componentry of the electric vehicle 10. The mode controller 52 may be configured to facilitate diagnosing, measuring, or otherwise processing information associated with components included within the electric vehicle 10. The mode controller 52 may be used in cooperation with and/or independently of the motor controller 48 to facilitate the operations contemplated herein, and may include capabilities for communicating over a vehicle network or otherwise exchanging information with other controllers and componentry within the electric vehicle 10 to that end. The mode controller 52, accordingly, may be configured to facilitate selectively implementing the drive modes according to driver input, e.g., command or selection made through an infotainment or telematics unit, and/or remote input, e.g., wireless control signal originating from a handheld device or outside of the electric vehicle 10.

Figure 2:
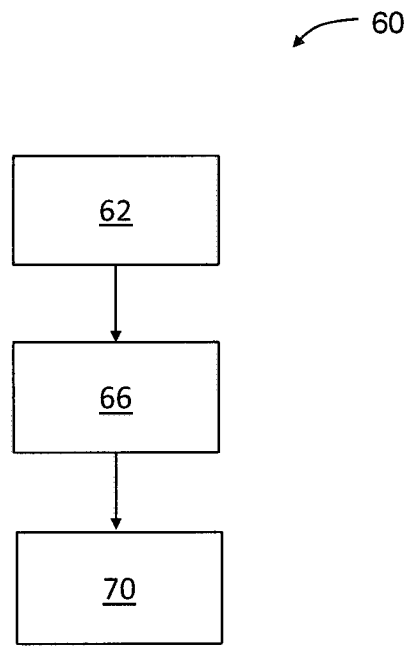
FIG. 2 illustrates a flowchart of a method for implementing a track mode in accordance with one non-limiting aspect of the present disclosure.

FIG. 2 illustrates a flowchart of a method 60 for implementing the track mode in accordance with one non-limiting aspect of the present disclosure. Block 62 relates to the mode controller 52 determining a demand for providing electrical power to the traction motor 16, such as in response to a corresponding input from the driver or another system or the electric vehicle 10, e.g., an autonomous control system may be configured to autonomously race the vehicle and/or the electric vehicle 10 may be raced through remote control. With respect to electric vehicle 10 being driven with an in-vehicle driver, the demand may be determined as a function of a displacement of an accelerator pedal 64. The electric vehicle 10 may include the accelerator pedal 64 as one skilled in the art will appreciate to facilitate communicating driver commands power, speed, acceleration, etc. to the motor controller 48 for implementation. The mode controller 52 may monitor the displacement, optionally with a displacement sensor, and/or receive a corresponding feedback from the motor controller 48. The displacement may correspond with the driver adjusting the pedal 64 depending on the amount of electrical power being demanded.

The displacement may correspond with a pedal map or other conversion whereby the amount of displacement may equate to requesting a corresponding quantity of electrical power. The accelerator pedal 64, for example, may be operable between a plurality of pedal positions depending on a pedal input received from the driver, i.e., depending on how hard and/or far the driver displaces the pedal 64. When at rest or when otherwise not being pressed by the driver, the pedal 64 may default to a zero or non-displaced position whereafter it may be displaced by the driver up to a full or complete displacement displace position where the accelerator pedal is pressed all the way down, i.e., full throttle. The pedal 64 may be controllable between any number of additional, incremental pedal positions between the non-displaced and fully displaced positions, which may be characterized as partial displacement positions. The pedal input, of course, in the case of the electric vehicle 10 being controlled through other mechanisms, may be replaced with another type of input sufficient for representing a demand to consume the supply of available electrical power.

Block 66 relates to mode controller 52 determining an active or previously selected one of the drive modes to be used in meeting the demand. One non-limiting aspect of the present disclosure contemplates the mode controller 52 being operable to switch between each of the drive modes while the electric vehicle 10 is in motion, and optionally while the driver is actively displacing the accelerator pedal 64. Particularly when racing, however, it may be beneficial to prevent or disable use of the non-track modes, i.e., the snow/ice, tour, and sport modes, as those modes may be less amenable to maximizing track performance in the manner contemplated herein, however, the present disclosure fully contemplates each of the modes being available, and optionally providing the driver a capability to pre-select or otherwise use one of the modes throughout driving, i.e., to enable full-time use of the qualify mode.

Block 66 may include the mode controller 52 assessing a mode selector 68 to be in one of an endurance state and a qualify state. The mode selector 68 may correspond with a paddle or other button or actuatable feature included on a steering wheel, such as one that may be pushed or pulled with pressure applied by the driver, and/or button or other interface included within an infotainment system through which driver commands may be received. When used while racing, one non-limiting aspect of the present disclosure contemplates it being beneficial for the driver to maintain contact with the steering wheel at all times such that the mode selector 68 may correspond with the driver pushing, pulling, or avoiding contact with the paddle. Block 66 may additionally include the controller 52 assessing a pedal position or displacement of the pedal 64, such as by determining whether the accelerator pedal is in a fully displaced position or a partially displaced position.

Block 70 relates to the mode controller 52 regulating the supply of electrical power provided to meet the demand according to the active one of the quality and endurance modes, i.e., the mode active at the time of receiving the demand in Block 62. The mode controller 52 may be configured to regulate the supply of electrical power by providing corresponding instructions to the electric power source 44, the inverter 46, and/or the motor controller 48. One non-limiting aspect of the present disclosure contemplates maximizing performance of the electric vehicle 10 while racing by configuring the endurance and qualify modes to include essentially identical values for each of the vehicle operating parameters, with the exception of the power values set for the maximum propulsion output parameter differing. The power values may be used for representing an amount or a percentage of electrical power the driver is permitted to request from the electrical power source 44 at any particular point in time, i.e., the portion of the supply of electrical power the driver may be entitled to access at the time of receiving the demand.

The true or actual supply of electrical power available from the electric power source 44 may vary throughout a race depending on a state of charge (SOC), temperature, lifecycle, and other influences on the electrical power source 44. The power value specified for the maximum propulsion output parameter may correspond with a percentage or portion of the true or actual amount of the supply the driver can use to meet the demand. Returning to the above Table, the power values are shown to be defined on a relative scale, with the power value for the qualify mode being set to 100 percent (100%) and the power value for the endurance mode being set less than 100 percent (<100%), e.g., 40%, 50%, 75%, etc. The endurance mode may be configured in this manner to provide the driver access to a limited amount of the power supply versus the quality mode providing access to a maximum available amount of the power supply. The power limitations imparted with the endurance mode may provide more performance consistency due to rapid consumption of the power supply being limited.

One non-limiting aspect of the present disclosure contemplates the qualify mode being beneficial in temporarily boosting performance by permitting the driver access to 100% of the available supply of electrical power, whereas the endurance mode may be beneficial in enabling the driver to maintain consistency throughout the race by conserving use of the electrical energy supply, which can be helpful in preventing the driver from draining the electrical power supply before the end of the race. The percentage decrease or de-tuning associated with the endurance mode may be a design parameter selected as part of a performance calibration process, e.g., 75% may be selected for a race having a certain duration and 50% may be selected for a longer race, i.e., the consistency increases as the power value decreases. The power value may be selected in this manner prior to a race based on strategy, ambient temperature, and/or other factors. The endurance mode, as such, may be the desired mode for a majority of the race in order to ensure completion, with the qualify mode being an optional feature the driver can engage when needing a boost in performance.

With a preference for the endurance mode to be predominantly used throughout the race, it may be beneficial to meet the demand determined in Block 62 according to the operating parameters of the endurance mode, i.e., using a limited amount of the available electrical power, unless circumstances warrant using a maximum available amount. Accordingly, one non-limiting aspect of the present disclosure contemplates relying on the endurance mode to meet the demand unless the pedal 64 is fully displaced, i.e., unless a displacement of the pedal 64 is at a maximum. While permitting use of the qualify mode when the pedal is less than fully displaced is contemplated, limiting the qualify mode to full displacement scenarios may be used to ensure access to the maximum available amount of electrical power is limited to situations where the limited amount is insufficient, which may occur while the driver is fully depressing the pedal 64 and still requires a boost in performance.

In the event that the demand determined in Block 62 coincides with the driver fully displacing the pedal 64, Block 70 may include assessing whether the endurance state or the qualify state was determined to be active in Block 66. The mode controller 52, for example, may be operable according to a temporary schedule whereby the qualify state may be determined as long as the driver is contemporaneously pushing or pulling on the mode selector 68, with the endurance state being defaulted to when the driver is not pushing or pulling the mode selector 68. The mode controller 52, alternatively, may be operable according to a persistent schedule whereby the qualify state determined in response to determining a first occurrence of the driver pushing or pulling the mode selector 68 and thereafter until determining a second occurrence of the driver pushing or pulling the mode selector 68, whereafter the endurance state may determined until a third occurrence of the pushing or pulling the mode selector 68, i.e., until the driver attempts to select the qualify state again. In this manner, when the pedal 64 is fully displaced, Block 70 may relate to meeting the demand according to the endurance mode when the endurance state is active and according to the qualify mode when the qualify state is active.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for controlling a supply of electrical power available for powering a traction motor of an electric vehicle, the system comprising:
    an accelerator pedal operable between a plurality of pedal positions depending on a pedal input received from a driver, the pedal positions representing a demand from the driver for powering the traction motor, the pedal positions including at least a partial displacement position and a full displacement position;
    a mode selector input within reach of the driver operable between an endurance state and a qualify state depending on a mode input received from a driver of the electric vehicle; and
    a mode controller operable to determine the mode selector to be in the endurance state or the qualify state and the accelerator pedal to be in the partial displacement position or the full displacement position, wherein the mode controller is operable for controlling the supply to meet the demand according to:
        an endurance mode when the endurance state and the full displacement position are determined, the endurance mode providing a limited amount of the supply to the traction motor; and
        according to a qualify mode when the qualify state and the full displacement position are determined, the qualify mode providing a maximum available amount of the supply to the traction motor on a temporary schedule only while the driver is pushing or pulling the mode selector.

2. The system according to claim 1 wherein the mode controller is operable for controlling the supply to meet the demand according to:
    the endurance mode when the endurance state and the partial displacement position are determined; and
    the endurance mode when the qualify state and the partial displacement position are determined.

3. The system according to claim 2 wherein:
    the full displacement position corresponds with a displacement position of the accelerator pedal being at a maximum; and
    the partial displacement position corresponds with the displacement position being less than the maximum and greater than zero.

4. The system according to claim 3 wherein the limited amount is a percentage of the maximum available amount, the percentage being less than 100 percent.

5. The system according to claim 4 wherein the mode controller is configured to determine the percentage as a function of a performance input received as part of a performance calibration process.

6. The system according to claim 1 wherein the temporary schedule is determined upon the electric vehicle passing another vehicle.

7. The system according to claim 1 wherein the mode controller is operable according to a persistent schedule, the persistent schedule determining the qualify state in response to determining a first occurrence of the driver pushing or pulling the mode selector and thereafter until determining a second occurrence of the of the driver pushing or pulling the mode selector, whereafter the endurance state is determined until a third occurrence of the pushing or pulling the mode selector.

8. The system according to claim 1 wherein the mode controller switches between the qualify and endurance modes without stopping the electric vehicle.

9. The system according to claim 1 wherein the mode selector is a paddle included on a steering wheel.

10. The system according to claim 1 wherein the mode selector is a button included on a touch screen of an infotainment system or a tactile button included within a reach of the driver.

11. A non-transitory computer readable storage medium having a plurality of non-transitory instructions stored thereon, the non-transitory instructions being executable with a processor to facilitate controlling a supply of electrical power available for powering a traction motor of an electric vehicle, the non-transitory instructions being operable for:
   determining a displacement position of an accelerator pedal to be one of a partial displacement position and a full displacement position, the displacement position representing a demand from a driver for powering the traction motor;
   determining a mode selector to be in one of an endurance state and a qualify state;
   controlling the supply to meet the demand according to an endurance mode when the endurance state and the full displacement position are determined; and
   controlling the supply to meet the demand according to a qualify mode when the qualify state and the full displacement position are determined on a temporary schedule only while the driver is pushing or pulling the mode selector.

12. The computer readable storage medium according to claim 11 wherein the endurance mode delivers a limited amount of the supply to meet the demand.

13. The computer readable storage medium according to claim 12 wherein the qualify mode delivers an maximum available amount of the supply to meet the demand.

14. The computer readable storage medium according to claim 13 wherein the non-transitory instructions are operable for controlling the supply to meet the demand according to the endurance mode when the partial displacement position is determined.

15. The computer readable storage medium according to claim 14 wherein the temporary schedule is determined upon the electric vehicle passing another vehicle.

16. The computer readable storage medium according to claim 14 wherein the non-transitory instructions are operable for determining the qualify state from a first occurrence of the driver pushing or pulling a mode selector and thereafter until a second occurrence of the driver pushing or pulling the mode selector.

17. A system for controlling a supply of electrical power available for powering a traction motor of an electric vehicle, the system comprising:
   a displacement position sensor operable to sense a displacement position of an accelerator pedal, the displacement position representing a demand from a driver for powering the traction motor;
   a mode selector operable between a qualify state and an endurance state; and
   a mode controller input within reach of the driver configured to control the supply to meet the demand according to:
      an endurance mode when the displacement position is less than a maximum displacement position;
      the endurance mode when the displacement position is at the maximum displacement position and the mode selector is in the endurance state; and
      a qualify mode when the displacement position is at the maximum displacement position and the mode selector is in the qualify state on a temporary schedule only while the driver is pushing or pulling the mode selector.

18. The system according to claim 17 wherein the qualify mode delivers an maximum available amount of the supply to meet the demand.

19. The system according to claim 18 wherein the endurance state delivers a limited amount of the supply to meet the demand when the displacement position at the maximum displacement position, the limited amount being less than the maximum available amount.

20. The system according to claim 19 wherein the mode controller is configured to determine the mode selector to be in the qualify state when a pressure is applied thereto by the driver and to be in the endurance state in an absence of the pressure.

* * * * *